United States Patent
Mukherjee

(10) Patent No.: US 8,626,174 B2
(45) Date of Patent: Jan. 7, 2014

(54) CALL SWITCHING IN PACKET-BASED COMMUNICATION NETWORKS

(75) Inventor: Subrata Mukherjee, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/513,731

(22) PCT Filed: Dec. 9, 2009

(86) PCT No.: PCT/CN2009/001393
§ 371 (c)(1),
(2), (4) Date: Jun. 25, 2012

(87) PCT Pub. No.: WO2011/069274
PCT Pub. Date: Jun. 16, 2011

(65) Prior Publication Data
US 2012/0264437 A1    Oct. 18, 2012

(51) Int. Cl.
| H04W 40/00 | (2009.01) |
| H04W 36/00 | (2009.01) |
| H04W 72/00 | (2009.01) |
| H04L 12/28 | (2006.01) |
| H04W 4/00 | (2009.01) |
| H04J 3/24 | (2006.01) |

(52) U.S. Cl.
USPC ........... 455/445; 455/436; 455/450; 370/356; 370/401; 370/331; 370/349

(58) Field of Classification Search
USPC ........... 455/436, 445, 450, 451, 452.1, 452.2, 455/453; 370/328, 331, 338, 349, 356, 401
See application file for complete search history.

(56) References Cited

U.S. PATENT DOCUMENTS

| 6,272,148 B1 * | 8/2001 | Takagi et al. ................. 370/469 |
| 6,400,719 B1 * | 6/2002 | Chimura et al. ......... 370/395.31 |
| 6,904,027 B1 * | 6/2005 | Mukherjee ..................... 370/331 |
| 6,987,757 B1 * | 1/2006 | Akiyama et al. .............. 370/353 |
| 7,366,188 B2 * | 4/2008 | Kim .............................. 370/401 |

(Continued)

FOREIGN PATENT DOCUMENTS

| CN | 1369161 A | 9/2002 |
| CN | 1722697 A | 1/2006 |
| CN | 101197772 A | 6/2008 |
| CN | 101262528 A | 9/2008 |

OTHER PUBLICATIONS

International Search Report (mailed Sep. 9, 2010) in Re: International Application No. PCT/CN2009/001393.

*Primary Examiner* — Christopher M Brandt
(74) *Attorney, Agent, or Firm* — Coats and Bennett PLLC

(57) ABSTRACT

Call setup methods in a packet-based communication network are provided comprising receiving a call setup request from a call request entity; in response to receiving the call setup request, obtaining a first network address of a first network entity and forwarding the first network address to the call request entity; obtaining a second network address of the call request entity and forwarding the second network address to the first network entity; handling a result code indicating whether a call communication between the call request entity and the first network entity can be established; and in case no communication can be established, obtaining a further network address of a further network entity, forwarding the further network address to the call request entity, and forwarding the second network address to the further network entity.

29 Claims, 8 Drawing Sheets

(56) References Cited

U.S. PATENT DOCUMENTS

| | | | |
|---|---|---|---|
| 8,031,671 B2* | 10/2011 | Harper et al. | 370/331 |
| 8,401,029 B2* | 3/2013 | Luo et al. | 370/401 |
| 2002/0196782 A1* | 12/2002 | Furukawa et al. | 370/352 |
| 2003/0126262 A1* | 7/2003 | Yoshida et al. | 709/226 |
| 2004/0028009 A1* | 2/2004 | Dorenbosch et al. | 370/329 |
| 2004/0133631 A1* | 7/2004 | Hagen et al. | 709/203 |
| 2005/0025146 A1* | 2/2005 | Brown et al. | 370/389 |
| 2006/0209891 A1* | 9/2006 | Yamada et al. | 370/468 |
| 2006/0235980 A1* | 10/2006 | Pote et al. | 709/227 |
| 2007/0058606 A1* | 3/2007 | Koskelainen | 370/351 |
| 2008/0219207 A1* | 9/2008 | Chen et al. | 370/328 |
| 2009/0080449 A1* | 3/2009 | Zhu | 370/401 |
| 2009/0097477 A1* | 4/2009 | Zhu | 370/352 |
| 2009/0213763 A1* | 8/2009 | Dunsmore et al. | 370/258 |
| 2009/0232021 A1* | 9/2009 | Bachmutsky | 370/254 |
| 2009/0257375 A1* | 10/2009 | Ishida | 370/328 |
| 2009/0290542 A1* | 11/2009 | Luo et al. | 370/328 |
| 2009/0316617 A1* | 12/2009 | Ichinohe | 370/315 |
| 2010/0034209 A1* | 2/2010 | Matsubara et al. | 370/401 |
| 2010/0272013 A1* | 10/2010 | Horn et al. | 370/328 |
| 2011/0002297 A1* | 1/2011 | Jain et al. | 370/331 |
| 2011/0044279 A1* | 2/2011 | Johansson et al. | 370/329 |
| 2011/0069827 A1* | 3/2011 | Desai et al. | 379/212.01 |
| 2012/0039304 A1* | 2/2012 | Kim et al. | 370/332 |

* cited by examiner

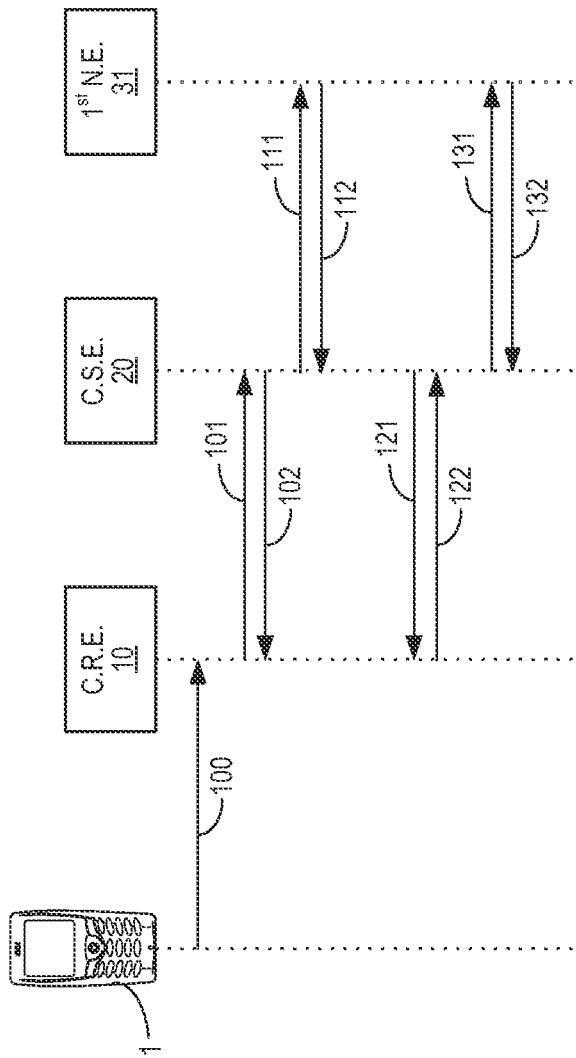

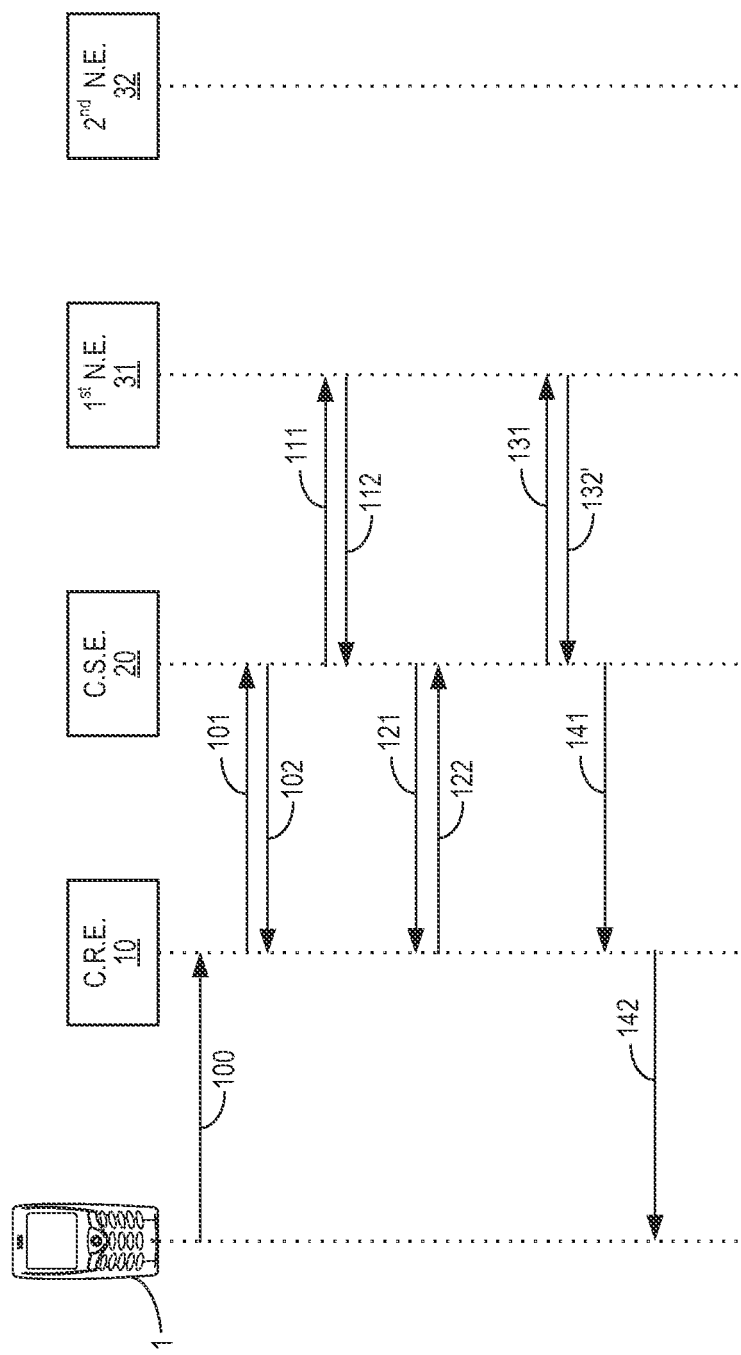

CALL SWITCHING IN PACKET-BASED COMMUNICATION NETWORKS

TECHNICAL FIELD

The present invention relates to call setup in packet-based communication networks. More specifically, the present invention relates to a method of operating a call switching entity and a call request entity in a packet-based communication network and to respective call switching entities and call request entities for use in packet-based communication networks.

BACKGROUND

Cellular networks for mobile communications are nowadays ubiquitous, and most densely populated parts of the world are already covered by at least one cellular network service. Since both user equipment—such as mobile phones or terminals—and infrastructure equipment of cellular type networks is highly standardized, respective components and devices are already available at reasonable cost. This allows for widespread use of such networks in developed as well as in developing countries.

In addition to these "consumer"-type cellular networks, there exists a large number of mobile communication systems that are exclusively for use by local or regional authorities or for government use only. Such mobile communication systems include radio communication services for use by the police, military, civil protection and emergency response services, such as fire brigades and medical first response services and the like. As such systems usually enjoy a somewhat higher priority as compared to consumer mobile communication, these systems have hitherto been implemented as discrete and independent communication networks and services, for example in form of analogue frequency modulation (FM-) based radio communication networks.

However, such systems often do not comply with modern requirements, since such conventional radio communication systems may be prone to eavesdropping with the result that virtually anybody can listen to police and/or emergency service conversations, and, as a consequence, access to confidential and/or private information is not securely restricted. Furthermore, conventional radio communication systems may also suffer from coverage problems in that local weather or also geographical conditions bar some regions from access to these networks and services. In this way, it may occur that a police car—although inside an area of administrative responsibility—is unable to use the communication service and to communicate with, for example, the respective headquarters.

In addition to the above, conventional radio communication systems used by authorities are often outdated since they rely on old equipment, which may also be specialized equipment being relatively expensive and cost-intense for maintenance and expansion. However, at the same time, modern cellular communication networks have evolved and provide widespread service of high-quality mobile communication. Moreover, cellular communication networks may offer far better service coverage, independence from weather conditions, and also the possibility to encrypt communication in order to render eavesdropping difficult or even impossible. As a consequence, there is the tendency to migrate communication systems for authorities and public services to existing cellular networks for mobile communication.

Since, however, respective communication of public services should be somewhat prioritized with respect to consumer communication applications, the concept of so-called National Security and Emergency Preparedness calls, in short: NS/EP-calls, has evolved in order to provide higher priority at the time of call setup to such calls and ensuring a maximum quality of service with respect to standard consumer calls. More specifically, the concept of NS/EP-calls allows users to obtain priority access to respective radio and/or infrastructure resources of the communication networks, such as radio traffic channels, media gateway resources, and trunk access.

NS/EP-calls can further be distinguished into two groups, namely into so-called Wireless Priority Service (WPS) calls and so-called Government Emergency Telecommunication Service (GETS) calls. In the former case of WPS calls, there is usually a respective WPS prefix dialed in front of the B-number in order to gain priority access to network resources, and the GETS calls can be invoked in the Mobile Switching Center (MSC) or Visitor Location Register (VLR) of the respective communication network even without any subscription data. GETS calls are usually invoked by dialing a respective GETS destination number for an originating call or by forwarding to a GETS number.

In other words, with an increasing number of NS/EP personnel and public services relying on cell phones while performing their emergency and/or authority duties, priority is granted for emergency calls made from cellular telephones and/or other related mobile communication equipment. Usually, in situations in which a cellular network operates under normal conditions, priority access may not provide any improved quality of service since resource availability allows for establishing a further call communication without any problems.

However, once network load increases, the situation may occur that parts of the radio and/or infrastructure resources, or a communication network as a whole, is in a so-called congested state, in which establishing a further call communication has become impossible. Similar problems occur, when parts of the network resources suffer from a breakdown caused by emergency situations such as natural disasters. In this way, the cause of diminished availability of network resources may also disadvantageously coincide with an increased need for network resources, in case, for example, natural events have destroyed parts of the network infrastructure, said natural events, however, requiring at the same time an increased, or at least a minimum, capacity of communication for event handling and disaster management.

As far as the implementation of cellular communication networks is concerned, modern standards, such as the specification as standardized by the Third Generation Partnership Project (3GPP, release 8), support so-called AoIP, in which the user plane of the GSM A-interface is carried over IP transport (Internet Protocol) instead of TDM (Time Division Multiplexing). Data communication over IP, however, requires that both ends of the communication are provided with each network address of the respective communication partner. Another difference between AoIP and AoTDM lies in that AoIP involves a two-step process for handling media gateway resources, namely, so-called reserve RTP (Real Time Protocol) connection point procedures and configure RTP connection point procedures.

FIG. 1A shows schematically a possible conventional way of call setup in a packet-based communication network that employs for user plane data communication, for example, IP. As shown in FIG. 1A, a mobile terminal 1, such as a cellular phone of NS/EP personnel, may send a call request 100 to a call request entity 10. In response to this, the call request entity 10 sends a call setup request message 101 to a call switching entity 20 that is responsible for call switching and preparing call communication in the packet-based communication network (the call switching entity 20 may acknowledge this by sending a call proceeding message 102 back to the call request entity 10). For this purpose, the call switching entity 20 sends a request message 111 (e.g. an ADD.Req-message) to a first network entity 31, for example a media gateway (MGW), that is selected to handle data flow from the call request entity 10 to a remote end (not shown). By means of a respective response message 112 (e.g. ADD.Rep) the first network entity 31 provides its own transport layer address as a first network address to the call switching entity 20.

The first network address of the first network entity 31 is then forwarded to the call request entity 10 with an assignment request message 121 (e.g. the respective BSSMAP message). In this way, the call request entity 10 now is in possession of the network address of the first network entity 31. Subsequently, the call request entity 10 provides its own transport layer address as a second network address with an assignment complete message 122 to the call switching entity 20. Once the call switching entity 20 has forwarded the second network address of the call request entity 10 to the first network entity 31 by a second request message 131 (e.g. MOD.Req), the first network entity 31 acknowledges reception thereof by a second response message 132 (e.g. MOD.Rep). Now both involved entities, the call request entity 10 and the first network entity 31 are in possession of the network address of the respective communication partner, and call communication and/or transport layer data transfer may commence.

However, as already mentioned above, cellular networks may suffer from congestion due to the increased call volume and/or damage to respective network infrastructure. This, however, may severely affect the ability of NS/EP personnel to make emergency calls and handle their communication via the cellular network. Therefore, WPS and GETS provide a priority treatment for call setup in AoIP, by means of so-called Media Gateway Polling (MGW-Polling). Such polling may include queuing calls in a call request entity, such as a Base Station Controller (BSC).

As shown in FIG. 1B, there may be the possibility that an attempt to establish a call communication between the call request entity 10 and the first network entity 31 fails, and the call switching entity 20 selects a second network entity 32 as part of said media gateway polling for establishing a connection between this second network entity 32 and the call request entity 10. As shown, the first network entity 31, in response to receiving the request message 111 (e.g. ADD.Req), may respond to the call switching entity 20 by a failure-state response message 112' (e.g. an ADD.Rep-message with an error code) that it is not available for communication.

In this case, the call switching entity 20 subsequently selects a second network entity 32 and sends a respective request message 111' (e.g. ADD.Req) to the second network entity 32. This entity 32 replies then with a response message 112" (ADD.Rep) forwarding its own transport layer address as a further network address to the call switching entity 20. The call switching entity 20 then forwards the further network address to the call request entity 10 (message 121), and the transport layer address of the call request entity 10 (second network address) is forwarded to the second network entity 32 (messages 122, 131), such that a call communication between the call request entity 10 and the second network entity 32 can be established. In general, call communication between the call request entity 10 and one of the network entities 31, 32, implies that both involved entities are in possession of the network address of the communication partner. In this way, it is the duty of the call switching entity 20 to facilitate network address exchange between the involved entities.

In this way, a call communication for a priority call originating from a prioritized mobile terminal 1 can be established although the first network entity 31 was not available for call communication. By means of immediately selecting another network entity, such as the shown second network entity 32, the call switching entity 20 provides prioritized call establishment for the mobile terminal 1. It is noted that in the situation of FIG. 1B, a conventional non-prioritized mobile terminal (consumer mobile phone), would have received a call reject message after the failure message 112' from the first network entity 31. In other words, media gateway polling is usually not conducted for non-prioritized mobile devices, for which it is accepted that the respective user receives a respective error message and needs to initiate another call attempt from the start. In this way, however, media gateway polling provides prioritized access to respective mobile devices for establishing NS/EP-calls.

Media gateway selection is, in general, the process to determine a media gateway, such as the first or the second network entity 31, 32, which is most suitable for a given traffic case. This enables flexible routing of the payload within the core network. It is a complete procedure from selection of a media gateway out of a so-called media gateway group (MGG) until the seizure and capturing of an access termination in the media gateway. It is noted that if the seizure of bearers in the media gateway group fails, i.e. all media gateways out of the media gateway groups were tried, then the media gateway group selection is initiated from the start and may be repeated several times (i.e. media gateway polling).

From the above description it becomes clear that media gateway polling works in case an error occurs early in the sequence of exchanging network addresses, for example in conjunction with sending the request message 111 or receiving the response message 112'.

However, as shown in FIG. 1C, it may also be possible that a communication failure occurs at another stage in the sequence, for example in conjunction with the second response message 132' (e.g. MOD.Rep). In such a situation, the call switching entity 20 would again send its request message 111 to the first network entity 31. For the first, this first network entity 31 provides its own transport layer address as the first network address with its response message 112 as shown and described in conjunction with previous Figures. The call switching entity 20 also continues to forward this first network address to the call request entity 10 (assignment request message 121) and the call request entity 10 forwards its own network address as the second network address with its assignment complete message 122.

At this point, however, the call switching entity 20 may either be unable to contact the first network entity 31, or may, albeit being able to send the respective second request message 131 (MOD.Req) to the first network entity 31, receive an error code with the second response message 132'. For example, the response message 132' could comprise an error code which indicates that the first network entity 31 is no longer able to handle a call communication to the call request entity 10 due to, for example, network congestion or codec incompatibility. In such a case, the only choice left could be to repeat the second request message (e.g. MOD-command) towards the same network entity—even if several network entities, such a media gateways, may have been included in a respective group (media gateway group—MGG) that is associated with the call request entity. This is because the network address of the first network entity (or a respective port number) has already been provided to the call request entity in the respective assignment request message.

This situation could, however, trigger a sequence of error messages 141 and 142 via the call request entity 10 to the mobile terminal 1 indicating that no call communication can be established, which would be equivalent to a call rejection. Such a rejection would, in any way, also imply that the user of the mobile terminal 1 needs to initiate a further attempt to establish a call. The requirement of a further manual call initiation is, however, unacceptable in case of prioritized call setup for NS/EP-calls.

SUMMARY

It is therefore an object of the present invention to provide an improved method of operating a call switching entity, of operating a call request entity, and for call setup in a packet-based communication network. It is also an object of the present invention to provide improved computer programs, improved computer program products, an improved call switching entity, and an improved call request entity for use in a packet-based communication network. In particular, it is an object of the present invention to provide more reliable call setup for prioritized calls in packet-based communication networks in case of media gateway polling.

These objects are achieved by the subject-matter of the independent claims. Preferred embodiments are described in the dependent claims thereto.

According to an embodiment of the invention, a method of operating a call switching entity in a packet-based communication network comprises receiving a call setup request from a call request entity; in response to receiving the call setup request, obtaining a first network address of a first network entity and forwarding the first network address to the call request entity; obtaining a second network address of the call request entity and forwarding the second network address to the first network entity; handling a result code indicating whether a call communication between the call request entity and the first network entity can be established; and in case no communication can be established, obtaining a further network address of a further network entity, forwarding the further network address to the call request entity, and forwarding the second network address to the further network entity.

Thus, in case no communication between the call request entity and the first network entity can be established, although parts of the network addresses have already been exchanged, further signaling can be avoided and, albeit the first network entity no longer being available for call communication, reliable call communication can be established between the call request entity and a second network entity.

In other words, the call switching entity retains all necessary information of the call request entity, such as the respective network address, until a target network entity, in this case the first network entity, indicates actual availability for call communication handling. In case the first network entity fails to handle the call communication, already buffered data, such as the first network address of the call request entity, are immediately forwarded to a second network entity and the respective transport layer address of the second network entity as a second network address is forwarded to the call request entity, which updates the respective address information for establishing a call communication to the second network entity.

According to another aspect of the present invention, a method of operating a call request entity in a packet based communication is provided, wherein the method comprises sending a call setup request to a call switching entity; receiving from the call switching entity a first network address of a first network entity for establishing a call communication to the first network entity; sending an own network address of the call request entity as a second network address to the call switching entity; receiving an address update from the call switching entity comprising a further network address of a further network entity; and establishing a call communication to the further network entity.

According to another embodiment of the present invention, a call setup method in a packet-based communication network is provided, wherein the method comprises receiving a call setup request from a call request entity; in response to receiving the call setup request, obtaining a first network address of a first network entity and forwarding the first network address to the call request entity; obtaining a second network address of the call request entity and forwarding the second network address to the first network entity; handling a result code indicating whether a call communication between the call request entity and the first network entity can be established; and in case no communication can be established, obtaining a further network address of a further network entity, forwarding the further network address to the call request entity, and forwarding the second network address to the further network entity.

According to further embodiments of the present invention a computer program is provided being loadable into a processing unit, wherein the computer program comprises code adapted to perform any of the steps of a method of an aspect of the present invention. Further, another embodiment of the present invention provides a respective computer program product that comprises such a computer program.

According to yet another embodiment of the present invention, a call switching entity for use in a packet-based communication network is provided, the call switching entity comprising a process unit that is adapted to receive a call setup request from a call request entity; in response to receiving the call setup request, to obtain a first network address of a first network entity and to forward the first network address to the call request entity; to obtain a second network address of the call request entity and to forward the second network address to the first network entity; to handle a result code indicating whether a call communication between the call request entity and the first network entity can be established; and in case no communication can be established, to obtain a further network address of a further network entity, to forward the further network address to the call request entity, and to forward the second network address to the further network entity.

According to still another embodiment of the present invention, a call request entity for use in a packet-based communication network is provided, the call request entity comprising a processing unit that is adapted to send a call setup request to a call switching entity; to receive from the call switching entity a first network address of a first network entity for establishing a call communication to the first network entity; to send an own network address of the call request entity as a second network address to the call switching entity; to receive an address update from the call switching entity comprising a further network address of a further network entity; and to establish a call communication to the further network entity.

BRIEF DESCRIPTION OF THE DRAWINGS

Embodiments of the present invention, which are presented for better understanding inventive concepts but which are not to be seen as limiting the invention, will now be described with reference to the Figures, in which:

FIGS. 1A to 1C show schematic representations of call setup in packet-based communication networks as of the conventional arts;

DETAILED DESCRIPTION

Figure 1B:
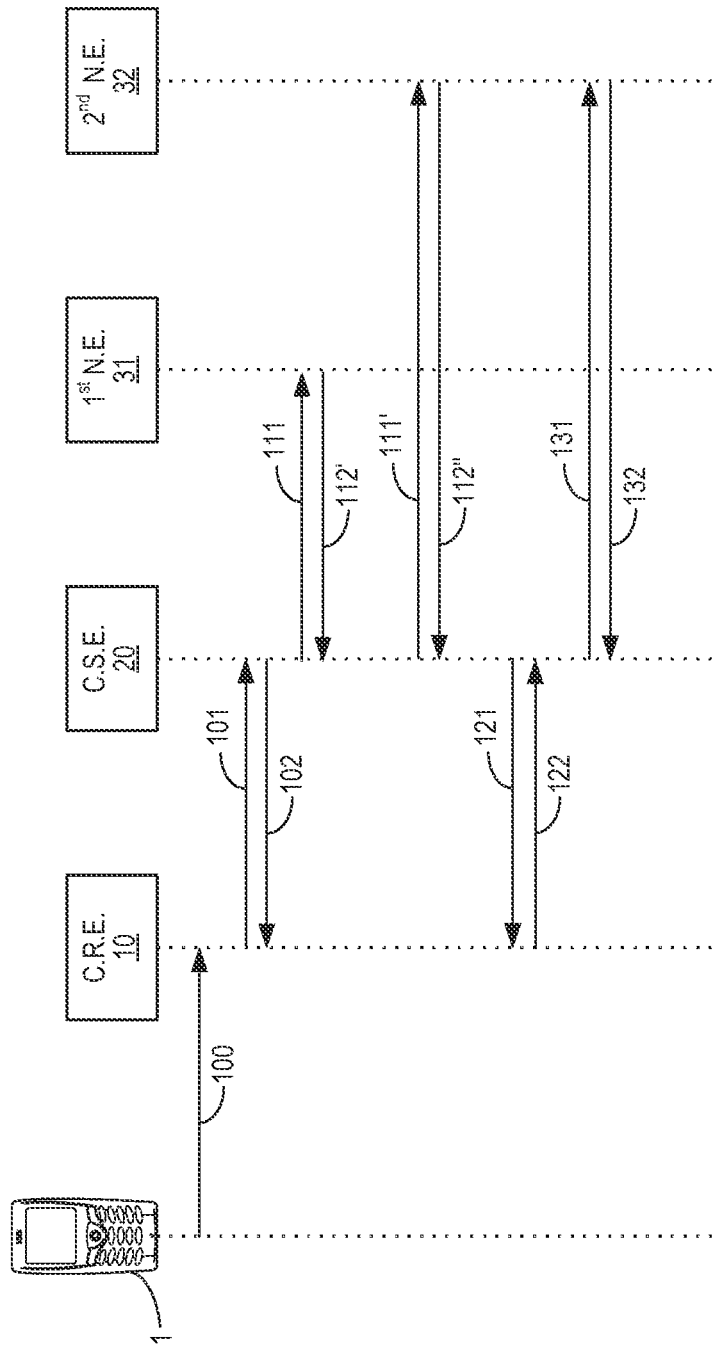

As understood by the present invention, a call switching entity can be any entity that handles—or is involved with—establishing a call communication between two entities in a packet-based communication network. In this way, the call switching entity can be a Mobile Switching Center (MSC) of a digital GSM, PCS, or UMTS mobile phone network being an interface between the radio network of the Base Station Subsystem (BSS) and the Core Network (CN). In the example of AoIP in 3GPP GSM Networks, it is the MSC that is involved with establishing a communication between a call request entity and respective network entities such as media gateways, and, in particular, with exchanging the involved transport layer addresses.

The call request entity should be understood as any entity that may bring forward a call request to the call switching entity. In this way, the call request entity can be a Base Station Controller (BSC) that controls a plurality of Base Transceiver Stations (BTS) which, in turn, handle radio communication to the mobile terminals.

Further, the first and the second network entity may be any entities of a packet-based communication network that are involved with communication to a remote end, such as another mobile phone/terminal or a gateway to a fixed-line communication network. In this way, the first and second network entities can be the so-called media gateways of one or several media gateway groups (MGW). Said media gateways handle the user plane communication of the call communication, i.e. handle the payload data comprising digitally encoded sound data, original digital data, or digitally encoded video data. Said gateways may also comprise functionality for changing the used codecs for encoding and/or decoding respective digital audio or video data into other digital data or also analogue signals. Thus, as a further example, a media gateway may also comprise a digital to analogue converter (DAC) that generates an analogue speech signal (AF, audio frequency) from digital PCM voice data for feeding into an analogue communication network, such as an AF telephone network.

The first, the second, and the further network addresses are transport layer addresses, such as target addresses in packet-based communication networks that indicate the originator and the target of respective transferred data. Examples for a packet-based communication network and the respective network addresses are the internet, internet-based communication networks, and Internet Protocol (IP) network addresses.

In general, the present invention is further to be understood that obtaining any network address may comprise the initial sending of a respective request message in order to request the network address to be sent from a respective network entity, or, simply by receiving a message that comprises the respective network address. Obtaining of network addresses may also be facilitated by searching a local network address database, in particular also by looking up in a respective network address table.

Further, the handling of a result code that indicates whether a call communication between the call request entity and the first network entity can be established may include receiving of an actual error code or a related error message, but can as well include the generation of the error code inside the call switching entity itself without any further communication involved. In the former case, the first network entity may send a dedicated message, such as the response message (ADD.Rep) or second/modification response message (MOD.Rep) which includes a specific message part of an error code indicating that the first network entity is no longer available for call communication to the call request entity.

The first network entity, or any other network entity, may trigger the sending of a respective error code in case, for example, the network entity is congested and is no longer able to handle additional network traffic. Further, the network entity can also indicate a certain codec incompatibility with the error code, wherein such an incompatibility would render impossible call communication from the call request entity beyond the first network entity. In other words, the first network entity may be unable to handle or process digital encoded data from the call request entity and may be, therefore, obliged to indicate the incompatibility to the call request entity.

Further, the call switching entity may by itself generate the result code, for example, by means of considering a timeout period until it expects a reply from the first network entity, such as the second response message. As an example, the call switching entity may send a request message (ADD. Req; MOD.Req) to the first network entity and may, subsequently, await respective response messages (ADD.Rep; MOD.Rep) within a given time period. In case no such response message is received within the time period, the call switching entity may determine that the first network entity is no longer available for call communication and, therefore, generates a respective result code.

Further, the present invention is to be understood that the result code indicates whether a call communication between the call request entity and the first network entity can be established. Such a result code may include situations in which the first network entity is—in principle—able to carry out a call communication to the call request entity, but is only temporarily unable to handle a respective call communication. Further, the result code may as well indicate a general impossibility, in that the first network entity is no longer available, for example due to damage to network equipment, or the network entity is unable to process data of a respective call communication due to codec and/or processing-software incompatibilities.

Figure 2:
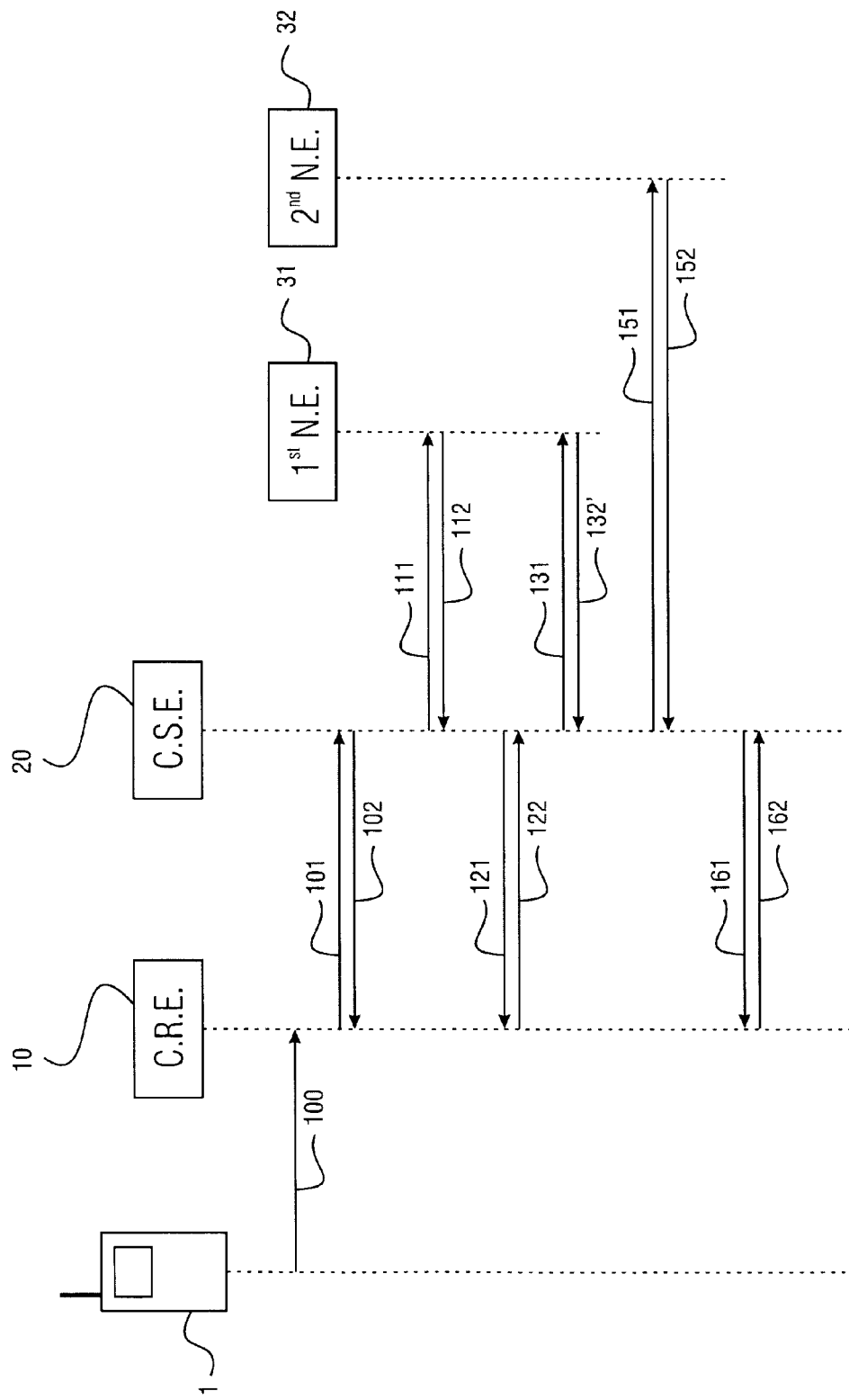
FIG. 2 shows a schematic representation of call setup in a packet-based communication network according to a first embodiment of the present invention.

FIG. 2 shows a schematic representation of a call setup method according to a first embodiment of the present invention. As already described earlier, a mobile terminal 1 of a priority user sends a call request 100 to the call request entity 10. The call request entity 10 sends a setup message 101 to the call switching entity 20, initiating a sequence for exchanging involved network addresses and, ultimately, establishing a call communication. The call switching entity 20 acknowledges the reception of the call setup request message 101 by the call proceeding message 102.

In response to receiving the call setup request message 101, the call switching entity 20 sends a request message 111 (ADD.Req) to the first network entity 31 of a group of network entities or a plurality thereof. The first network entity 31 responds to the request message 111 by sending a response message 112 (ADD.Rep) comprising the transport layer address of the first network entity as the first network address toward the call switching entity 20. The call switching entity 20 then forwards the first network address with an assignment request message 121 to the call request entity 10 that replies with an assignment complete message 122 comprising the own transport layer address of the call request entity 10 as a second network address.

The call switching entity 20 may now buffer the received second network address and sends a second request message 131 (MOD.Req) to the first network entity 31 such that both scheduled communication partners are provided with the addresses of their respective communication partners. However, as depicted in FIG. 2, the first network entity 31 is unable to establish a call communication to the call request entity 10 and returns a second response message 132' (MOD.Rep) which contains a respective error code. The call switching entity 20 handles this error code as a result code that indicates whether a call communication can be established between the call request entity 10 and the first network entity 31. As already mentioned earlier, the result or error code can well be generated by the call switching entity 20 itself, if, for example, already the sending of the second request message 131 fails, or no response message thereto is received within a given time period (timeout).

Instead of indicating the error to the call request entity 10, which would, eventually, cause a call rejection to the mobile terminal 1, the call switching entity 20 makes use of the buffered second network address of the call request entity 10, and forwards this address with a further request message 151 (ADD.Req) to a second network entity 32. In case the second network entity 32 replies a successful response message 152 (ADD.Rep), the second network entity 32 may immediately forward its own transport layer address as a further network address to the call switching entity 20 with the a respective response message 152 (ADD.Rep).

It is then that the call switching entity 20 sends a transport layer address update 161 to the call request entity 10 which indicates that the call communication is to be established between the call request entity 10 and the second network entity 32 instead of the first network entity 31. In this way, the call request entity 10 may disregard the first network address as already received in conjunction with the assignment request message 121 and may further send a transport layer address acknowledgement message 162 to the call switching entity 20, in order to indicate that all necessary network addresses have now been exchanged and actual call communication may commence.

Figure 3:
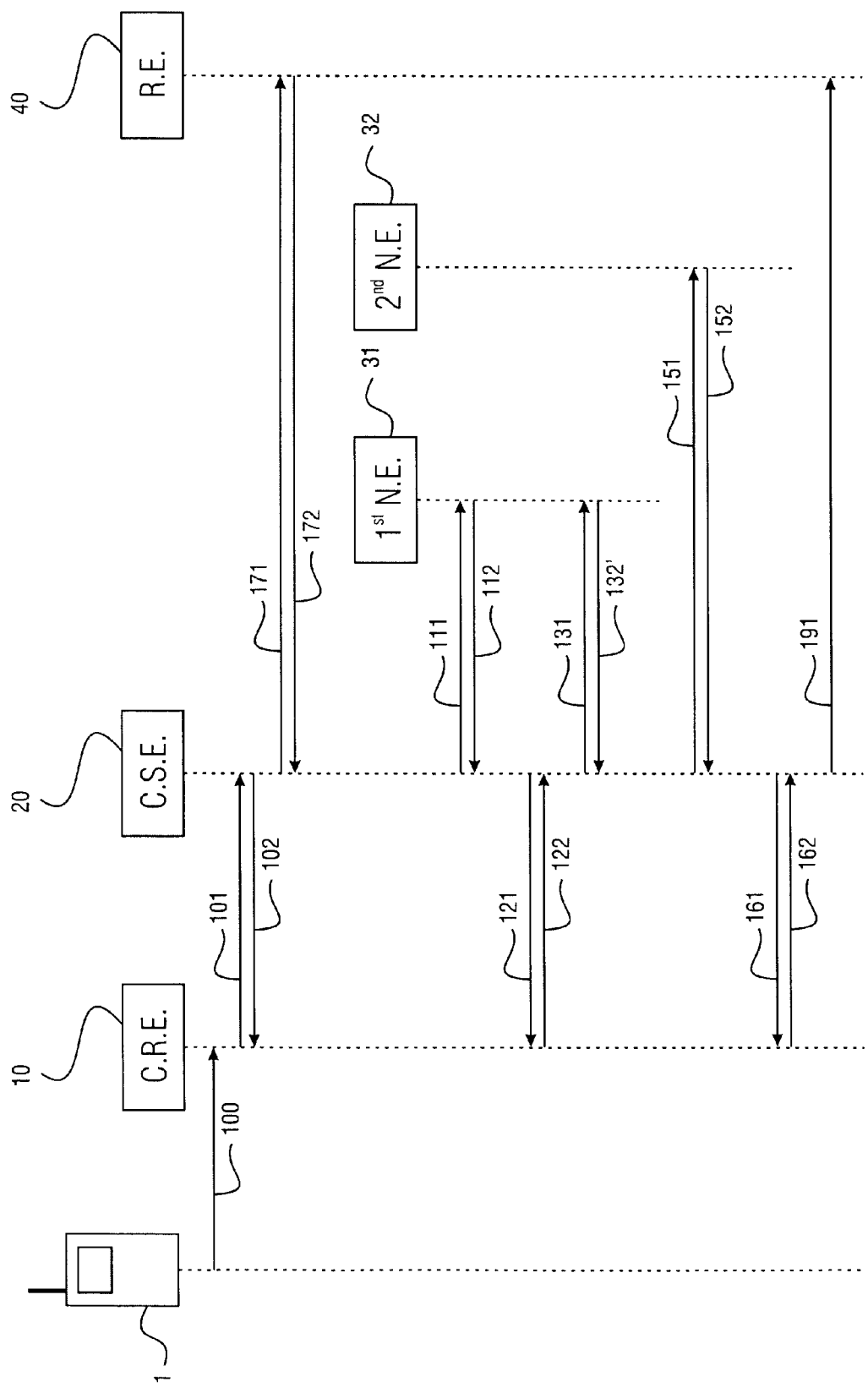
FIG. 3 shows a schematic representation of call setup in a packet-based communication network according to a second embodiment of the present invention.

FIG. 3 shows a schematic representation of a call setup method in a packet-based communication network according to a second embodiment of the present invention. Similarly as shown and described in conjunction with FIG. 2, the call switching entity 20 exchanges network addresses between the call request entity 10 and the second network entity 32 in response to a call request from the priority mobile terminal 1.

However, as shown in FIG. 3, the call switching entity 20 sends an Initial Address Message (IAM) 171 to a remote end 40 in response to receiving the call setup request message 101 and prior to sending any request messages 111, 131, and 151, in particular, also prior to sending the request message 111 to the first network entity 31.

The remote end 40 may represent a node of the core network, a destination terminal, a destination mobile terminal, or a fixed line connection of an analogue telephone network. With the IAM message 171, the call switching entity 20 may indicate to the remote end 40 that it will receive a call shortly. The remote end 40 then may send an Acknowledgement Message (APM) 172 in response to receiving the IAM message 171 to the call switching entity 20. The call switching entity 20 may await the reception of this APM message 172 until it continues with media gateway polling or, specifically, with sending the first request message 111 to the first network entity 31. The method as shown in FIG. 3 may further comprise sending of a Continuity Message (COT) 191 from the call switching entity 20 to the remote end 40 in response to receiving the final transport layer address acknowledgement message 162 from the call request entity 10.

According to further embodiments of the present invention, the request message 111 and the response message 112 may represent a procedure for reserving a Real Time Transport Protocol (RTP) connection point, whereas the second or modification request message 131 and the respective second or modification response message 132' may represent a procedure for configuring the RTP connection point. However, in contrast to this, the request message 151 already contains the second network address of the call request entity 10, as compared to the request message 111 that does not comprise any network address. This request message 151 and the response message 152 may thus represent a combined procedure of reserving and configuring the RTP connection point.

The procedure for reserving the RTP connection point may result in a seizure (reservation) of the first network entity, such as a first media gateway and the reserve procedure for reserving the RTP connection point is initially successful. However, since the respective response message 132' indicates an error code, the procedure for configuring the RTP connection point is unsuccessful. However, the polling of several media gateways, in this case the polling of at least the second network entity 32, results in the selection of the second network entity 32 and the seizure thereof. In this way, media gateway polling is successful even in case an error code occurs between the pair of the request (ADD.Req) and response (ADD.Rep) messages and the pair of the second or modification request (MOD.Req) and the second (MOD.Rep) message.

Figure 4A:
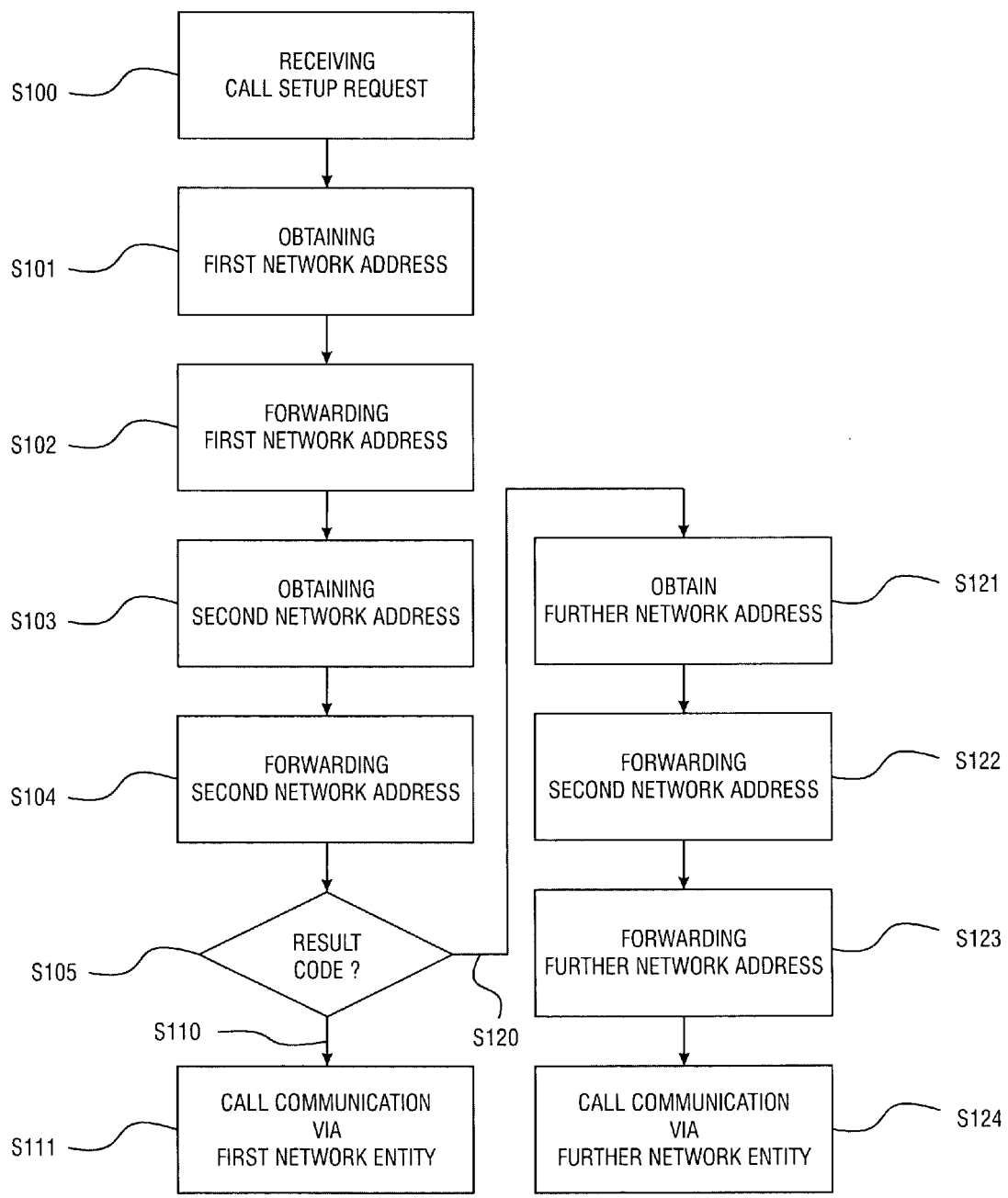
FIG. 4A shows a flowchart of a method of operating a call switching entity according to a third embodiment of the present invention.
Figure 5A:
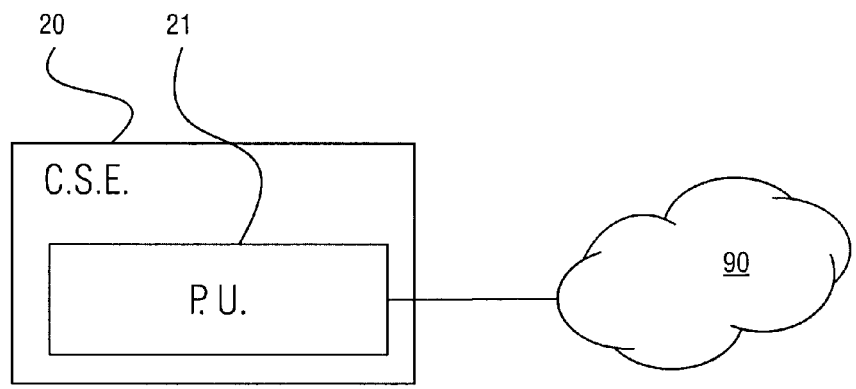
FIG. 5A shows a schematic representation of a call request entity according to a fifth embodiment of the present invention.

FIG. 4A shows a flowchart of a method of operating a call switching entity according to a third embodiment of the present invention. This method may be executed in a processing unit 21 of the call switching entity 20 as shown in FIG. 5A.

As shown in FIG. 4A, the call switching entity 20 receives a call setup request (S100) and obtains, in response to receiving the call setup request, the first network address of the first network entity (S101) and forwards this first network address to a call request entity (S102). In response to this, the call switching entity 20 obtains the network address of the call request entity as a second network address (S103) and forwards this second network address to the first network entity (S104). The call switching entity then handles a result code (S105), and decides whether the result code indicates that a communication between the call request entity 10 and the first entity 31 can be established. In case such a call communication can be established (case S110), the call communication is established between the call request entity 10 and the first network entity 31 (S111), and no further network addresses have to be exchanged.

If, however, the result code indicates that no communication can be established between the call request entity 10 and the first network entity 31 (case S120), the call switching entity continues with obtaining a further network address of a second network entity (S121). The call switching entity then forwards the second network address, being the network address of the call request entity 10, to the second network entity 32 (S122), and also forwards the further network address to the call request entity 10 (S123). This now enables a call communication between the call request entity 10 and the further network entity 32 (S124). In general, however, it is to be noted that the order of forwarding the second network address and forwarding the further network address (steps S122 and S123) may also be other way round, in such that the further network address is forwarded first.

Figure 4B:
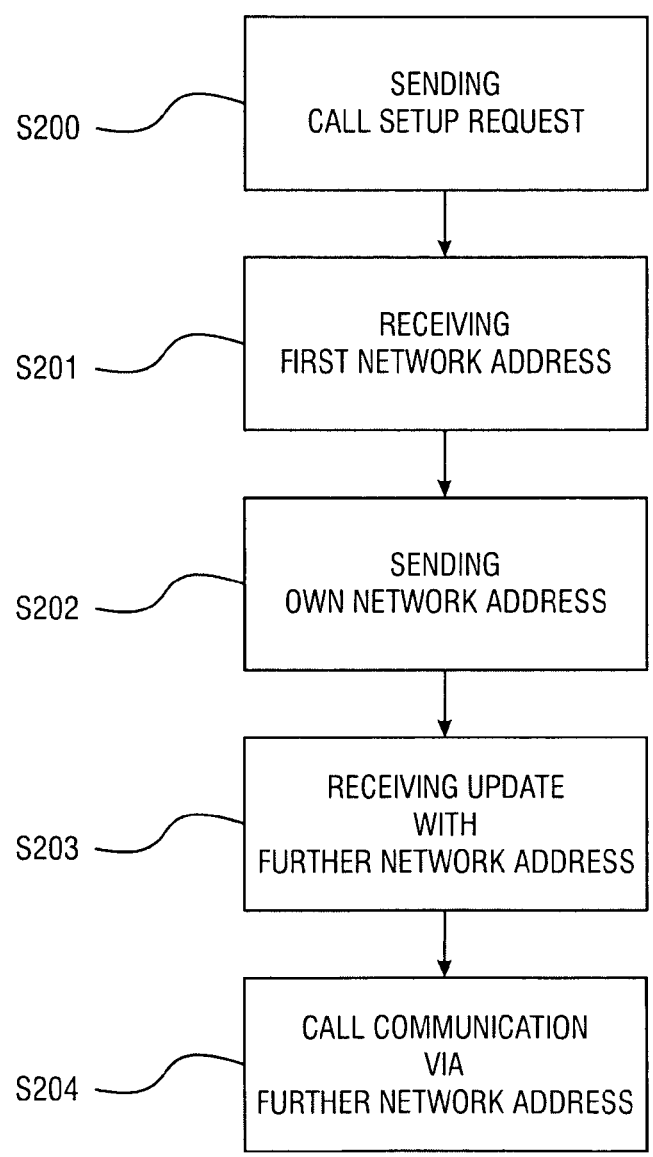
FIG. 4B shows a flowchart of a method of operating a call request entity according to a fourth embodiment of the present invention.

FIG. 4B shows a flowchart of a method of operating a call request entity according to a fourth embodiment of the present invention. This method may be executed in a processing unit 11 of the call request entity 10 as shown in FIG. 5B.

FIG. 4B shows a flowchart of a method of operating a call request entity according to a fourth embodiment of the present invention. The call request entity, for example in response to receiving a call request from a mobile terminal 1, sends a call setup request to a call switching entity (S200) for indicating the request to setup a call communication. The call request entity then receives a first network address (S201) of a first network entity and, in response thereto, sends its own network address as a second network address in step S202. However, prior to establishing a call communication to the first network entity, the call request entity receives an update with a further network address (S203), discards the first network address as received during step S201, and is now ready to establish a call communication via the further network address to the second network entity (S204).

FIG. 5A shows a schematic representation of a call switching entity 20 according to a fifth embodiment of the present invention. Accordingly, the call switching entity 20 comprises a processing unit 21 for carrying out the method as described in conjunction with an embodiment of the present invention, or only single steps thereof. For receiving, sending, and/or obtaining messages, addresses, and related data, the processing unit 21 is connected to a network 90, which may be a packet-based communication network in which the call switching entity is to exchange network addresses between entities such that they may establish a call communication.

Figure 5B:
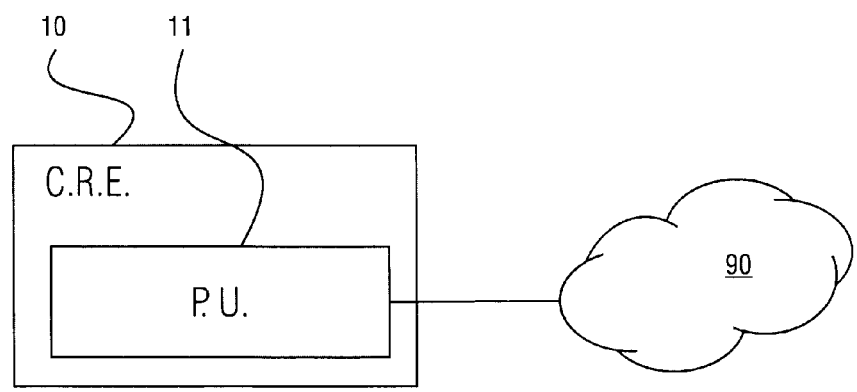
FIG. 5B shows a schematic representation of a call switching entity according to a sixth embodiment of the present invention.

FIG. 5B shows a schematic representation of a call request entity according to a sixth embodiment of the present invention. Accordingly, the call request entity 10 comprises a processing unit 11 for carrying out the method as described in conjunction with an embodiment of the present invention, or only single steps thereof. For receiving, sending, and/or obtaining messages, addresses, and related data, the processing unit 11 is connected to a network 90, which may again be the packet-based communication network.

According to further embodiments of the present invention, if the configure RTP connection point procedure fails towards a first media gateway (first network entity), the MSC (call switching entity) may use polling of media gateways to select a second media gateway (second network entity). Once the second MGW termination is seized using a reserve RTP connection point procedure, the MSC will inform the BSC (call request entity) about the new MGW transport layer address using, a new BSSMAP message, for example named as "Transport Layer Address Update", of which the structure/description could be: "TRANSPORT LAYER ADDRESS UPDATE", and:

| INFORMATION ELEMENT | REFERENCE | DIRECTION | TYPE | LEN |
|---|---|---|---|---|
| Message Type | X.X.X.X | MSC-BSS BSS-MSC | M | 1 |
| AoIP Transport Layer Address | X.X.X.X | MSC-BSS BSS-MSC | M | 8-20 |

This message may be sent if or only if both the BSS (Base Station Subsystem) and the MSC support an IP based user plane A-interface. This message may be sent from the MSC to the BSS via the relevant SCCP connection to trigger a MGW transport layer address update. This message may further correspond to the address update message 161 as described in conjunction with embodiments of the present invention.

The BSC may acknowledge such a message and may include the BSC Transport Layer Address in the message. The structure of the ACK message could be: "TRANSPORT LAYER ADDRESS ACK":

| INFORMATION ELEMENT | REFERENCE | DIRECTION | TYPE | LEN |
|---|---|---|---|---|
| Message Type | X.X.X.X | BSS-MSC MSC-BSS | M | 1 |

Such a message may be sent from the BSS to the MSC. It may indicate to the receiving entity that the transmitting entity has updated the transport layer address. This message may further correspond to the address acknowledgement message 162 as described in conjunction with embodiments of the present invention. If, optionally, an IE (AOIP Transport layer Address) is included, then the receiving entity has to update the corresponding address. This message may only be used for connections using an IP based user plane interface. After this, the call setup may continue.

Further exemplary embodiments may include an MSC to setup a WPS/GETS call from a WPS/GETS user covered by an AoIP BSC to another user. The AoIP BSC can be connected to a plurality of MGWs belonging to a particular MGG (Media Gateway Group). The WPS/GETS call setup in AoIP mode continuing to the point of successful RESERVE RTP CONNECTION POINT procedure by which MSC received the MGW Transport Layer Address which is then passed to BSC in ASSIGNMENT REQUEST message and receiving the BSC Transport Layer Address in the response message ASSIGNMENT COMPLETE and in turn transferring the BSC Transport Layer Address to MGW via CONFIGURE RTP CONNECTION POINT procedure as needed or specified for AoIP. However, this resulting in unsuccessful CONFIGURE RTP CONNECTION POINT procedure as returned by MGW for any reason—for example, MGW resource congestion, or link failure between MSC and MGW. The method comprising of allowing MSC node to attempt seizure of termination in another MGW node within the MGG (polling of MGW) using RESERVE AND CONFIGURE RTP CONNECTION POINT procedure including BSC Transport Layer Address received earlier until a termination is successfully seized when AoIP mode is used, enabling the very important WPS/GETS call to be successful which otherwise would have failed.

Also a respective method may comprise the capability of MSC, via a simple mechanism, to provide the new MGW Transport Layer Address to BSC whereupon the user plane connection between BSC and MGW can be correctly setup, and/or a method comprising providing this mechanism of transferring new MGW Transport Layer Address to BSC via a new pair of BSSMAP messages in accordance with existing standards, and/or above mechanisms and methods not interfering with existing functionality.

Above mechanisms and methods may further not unnecessarily delay the call setup attempt, considering the importance of WPS/GETS calls, and attempting to complete the call setup at the fastest possible time when all resources for the call have been obtained. Above mechanisms and methods may further require only the minimum amount of information exchange between the concerned nodes necessary to serve the purpose.

Further exemplary embodiments may include a BSC returning an acknowledgement in the mechanism positively acknowledging that BSC node is in possession of correct MGW transport layer address, and thus establishing the correct user plane path. Above methods being may be extended to cover the situation when for whatever reason MGW transport Layer address needs to be changed and the change needs to be communicated via MSC to BSC for correct user plane setup. Above methods may also be extended to cover the situation when for whatever reason BSC transport Layer address needs to be changed and the change needs to be communicated via MSC to MGW for correct user plane setup.

According to further embodiments of the present invention, the described concepts, mechanisms, and methods may also applicable to call sequences for a mobile terminating call.

According to yet further embodiments of the present invention, advantages may be attained in that it may be allowed to users to obtain priority access to MGW resources when MGW congestion/failure prevents call establishment. By allowing to attempt MGW resource seizure in another MGW than the one where it failed, the chance of successful call establishment for NS/EP call can be greatly increased. Further, polling may continue with existing AoIP mechanisms.

Although detailed embodiments have been described, these only serve to provide a better understanding of the invention defined by dependent claims, and are not to be seen as limiting.

The invention claimed is:

1. A method of operating a call switching entity in a packet-based communication network, the method comprising:
    receiving a call setup request from a call request entity;
    in response to receiving the call setup request, obtaining a first network address of a first network entity and forwarding the first network address to the call request entity;
    obtaining a second network address of the call request entity and forwarding the second network address to the first network entity;
    handling a result code indicating whether a call communication between the call request entity and the first network entity can be established;
    in response to the result code indicating that no call communication can be established between the call request entity and the first network entity:
        obtaining a further network address of a further network entity;
        forwarding the further network address to the call request entity;
        forwarding the second network address to the further network entity.

2. The method of claim 1 wherein the call switching entity is a mobile switching center of the packet-based communication network.

3. The method of claim 1 wherein the call request entity is a base station controller of the packet-based communication network.

4. The method of claim 1 wherein the first network entity and the further network entity are media gateways of the packet-based communication network.

5. The method of claim 1 wherein the call communication is a user-plane communication in the packet-based communication network.

6. The method of claim 1 wherein the packet-based communication network is a cellular mobile communication network.

7. The method of claim 1 wherein the first network address, the second network address, and the further network address are internet protocol transport layer addresses.

8. The method of claim 1 wherein the obtaining the second network address and forwarding the second network address to the first network entity are in response to obtaining the first network address.

9. The method of claim 1 further comprising exchanging call related information between the call request entity and at least one of the first and further network entities.

10. The method of claim 9 wherein the call related information comprises codec data of a codec used for the call communication.

11. The method of claim 10 wherein the result code indicates codec incompatibility between the call request entity and the first network entity.

12. The method of claim 1 wherein the result code is part of an error message from the first network entity.

13. The method of claim 1 wherein the result code indicates expiry of a time-out period during which no response has been received from the first network entity.

14. The method of claim 1 wherein the call communication is carried out over A-interface over Internet Protocol.

15. The method of claim 1 wherein the call communication is a communication of a national security and emergency preparedness call.

16. A method of operating a call request entity in a packet-based communication network, the call request entity having an own network address associated therewith, the method comprising:
    sending a call setup request to a call switching entity;
    receiving, from the call switching entity, a first network address of a first network entity for establishing a call communication to the first network entity;
    sending the own network address as a second network address to the call switching entity;
    receiving an address update from the call switching entity comprising a further network address of a further network entity;
    establishing a call communication to the further network entity.

17. The method of claim 16 wherein the sending the call setup request to the call switching entity comprises sending the call setup request to the call switching entity in response to receiving a call request from at least one of a mobile terminal and a base transceiver station.

18. The method of claim 16 wherein the call switching entity is a mobile switching center of the packet-based communication network.

19. The method of claim 16 wherein the call request entity is a base station controller of the packet-based communication network.

20. The method of claim 16 wherein the first network entity and the further network entity are media gateways of the packet-based communication network.

21. The method of claim 16 wherein the call communication is a user-plane communication in the packet-based communication network.

22. The method of claim 16 wherein the packet based communication network is a cellular mobile communication network.

23. The method of claim 16 wherein the first network address, the second network address, and the further network address are internet protocol transport layer addresses.

24. The method of claim 16 wherein the call communication is carried out over A-interface over Internet Protocol.

25. The method of claim 16 wherein the call communication is communication of a national security and emergency preparedness call.

26. A call setup method in a packet-based communication network, the method comprising:
   receiving a call setup request from a call request entity;
   in response to receiving the call setup request, obtaining a first network address of a first network entity and forwarding the first network address to the call request entity;
   obtaining a second network address of the call request entity and forwarding the second network address to the first network entity;
   handling a result code indicating whether a call communication between the call request entity and the first network entity can be established;
   in response to the result code indicating that no call communication can be established between the call request entity and the first network entity:
      obtaining a further network address of a further network entity;
      forwarding the further network address to the call request entity;
      forwarding the second network address to the further network entity.

27. A computer program product stored in a non-transient computer readable medium for controlling a processing unit in a packet-based communication network, the computer program product comprising software code instructions which, when run on the processing unit, causes the processing unit to:
   receive a call setup request from a call request entity;
   in response to receiving the call setup request, obtain a first network address of a first network entity and forward the first network address to the call request entity;
   obtain a second network address of the call request entity and forward the second network address to the first network entity;
   handle a result code indicating whether a call communication between the call request entity and the first network entity can be established;
   in response to the result code indicating that no call communication can be established between the call request entity and the first network entity:
      obtain a further network address of a further network entity;
      forward the further network address to the call request entity;
      forward the second network address to the further network entity.

28. A call switching entity for use in a packet-based communication network, the call switching entity comprising a processing unit configured to:
   receive a call setup request from a call request entity;
   in response to receiving the call setup request, obtain a first network address of a first network entity and forward the first network address to the call request entity;
   obtain a second network address of the call request entity and forward the second network address to the first network entity;
   handle a result code indicating whether a call communication between the call request entity and the first network entity can be established;
   in response to the result code indicating that no call communication can be established between the call request entity and the first network entity:
      obtain a further network address of a further network entity;
      forward the further network address to the call request entity;
      forward the second network address to the further network entity.

29. A call request entity for use in a packet-based communication network, the call request entity, the call request entity having an own network address associated therewith, the call request entity comprising a processing unit configured to:
   send a call setup request to a call switching entity;
   receive from the call switching entity a first network address of a first network entity for establishing a call communication to the first network entity;
   send the own network address of the call request entity as a second network address to the call switching entity;
   receive an address update from the call switching entity comprising a further network address of a further network entity;
   establish a call communication to the further network entity.

* * * * *